INVENTOR.
DONALD E. QUINLAN

BY

ATTORNEY 3,248,566

ELECTRONIC SWITCH IN WHICH SET PULSE TO ONE BISTABLE MULTIVIBRATOR ALSO RESETS OTHER MULTIVIBRATORS

Donald E. Quinlan, Lincoln Park, N.J., assignor to Visual Electronics Corp., a corporation of New York Filed Feb. 25, 1963, Ser. No. 260,387
5 Claims. (Cl. 307—88.5)

This invention relates to electrical circuits and more particularly to electronic switches for use in controlling electrical circuits.

Bistable multivibrators, or flip-flop circuits, are commonly used as electronic switches to change selectively the state of associated circuits. These flip-flop switches generally have "set" and "reset" terminals and are adapted to turn the associated circuit On when, with the flip-flop circuit in a reset condition, a selected voltage having a selected waveform such as a pulse is applied to the set terminal. It is, of course, turned Off when another pulse is applied to the reset terminal. The set and reset pulses are usually applied through asymmetric impedances such as diodes to the associated set and reset terminals in order to insure that pulses of the proper polarity are applied thereto.

In certain applications it is desirable to provide a plurality of flip-flop circuits for switching an associated controlled circuit of this type wherein only one of the controlled circuits is On at a time, the other controlled circuits being Off with their associated flip-flops in a reset condition. Such circuits are analogous to electromechanical, push button switching circuits, with the push buttons so interlocked that only one button at a time is effective to actuate a circuit.

Heretofore when a plurality of flip-flop circuits have been used for multiple switching application, elaborate diode matrices have been used to insure that only a desired flip-flop is turned On while all other flip-flops in a given switching system were placed in an Off condition. That is, for every source of On puses, a source of reset or Off pulses with associated channels, including a diode for each channel, had to be supplied to each flip-flop switcher in order to provide an Off or reset pulse each time a desired flop-flop was placed in an On condition. This resulted in a great complexity of diodes as the number of circuits to be switched increased.

When mechanical switches are used to apply set pulses to associated flip-flops to place them in the On condition, the problem of switch bounce is encountered, wherein spurious pulses are generated by the intermittent and erratic opening and closing of the switch as it gradually achieves a closed state. In certain flip-flop circuit arrangements where successive pulses are used to set and reset a flip-flop, the switch bounce condition will cause improper operation of the flip-flop switch as it erratically shifts from a set to a reset condition during closure of the mechanical switch. In some instances switch bounce has been such an inherent problem in flip-flop switcher control that often electronic, "one-shot" multivibrators are included as part of the flip-flop switch, adding greatly to the complexity thereof.

It is therefore an object of the present invention to provide a new and improved electronic switch for actuating electrical circuits.

It is a further object of the present invention to provide an electronic switch having input control means which operates the switch in a desired manner, independent of spurious input switching pulses.

It is yet another object of the present invention to provide an improved bistable electronic switch control circuit employing a minimum number of components, which do not multiply in number as the number of switches in a given organization is increased.

It is still another object of the present invention to provide a control circuit for a plurality of bistable electronic switches wherein a set signal for a selected switch, when transmitted thereto, is also effective to reset the remainder of the switches, without requiring a separate source of reset pulses therefor.

These objects are achieved according to the present invention which in its broader aspects includes a common reset bus connected to the reset terminals of one or more flip-flops in a multiple electronic switch unit. A separate time delay network is respectively connected to the set terminals of each flip-flop switcher. Means are further provided for transmitting a control pulse of a selected polarity simultaneously to both the common reset bus and to the time delay circuit of the flip-flop circuit to be switched thereby to an On condition. Thus, the pulse that sets a selected flip-flop circuit is the identical pulse that resets the same flip-flop and all others in the same switching unit that may have been set. That is, all flip-flop circuits are reset by the control pulse and then the circuit selected to be placed in an On condition is set, inasmuch as the same pulse is fed to the time delay circuit, slightly delayed in time and then transmitted to the set terminal where it functions accordingly.

A better understanding of the invention as related to the stated objects and other objects can be achieved by referring to the following specification and drawings, which form a part of this specification, and wherein.

Figure 1:
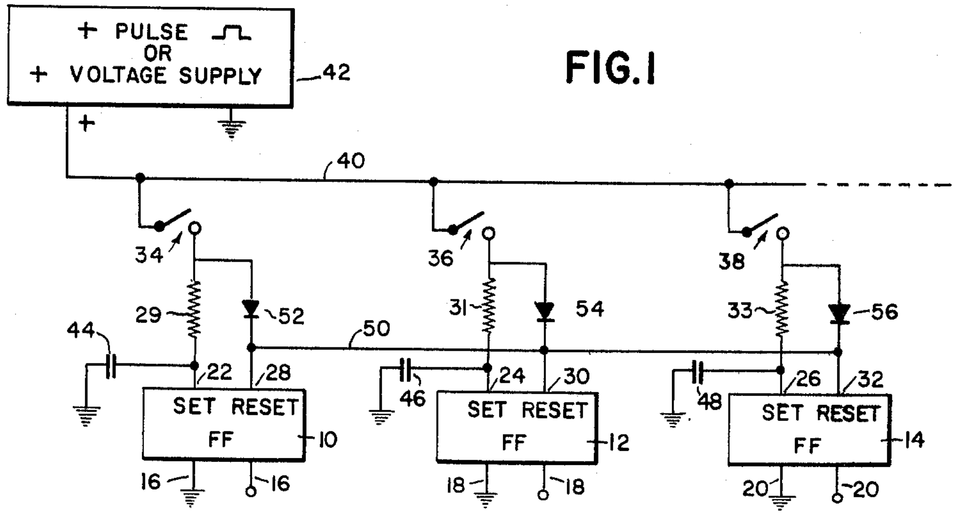
FIG. 1 is a schematic block diagram of a plurality of flip-flop switching circuits controlled in accordance with one embodiment of the invention.

Referring now to FIG. 1, a plurality of conventional flip-flop switching circuits are shown in block schematic form and generally indicated as 10, 12, 14. Each flip-flop has a pair of output terminals 16, 18, 20, respectively, which may serve as electronic switch terminals for changing the condition of associated electronic circuits, such as changing the impedance or a selected voltage thereof. While only three flip-flop switches are illustrated, it is understood that more or less than three switches may be used, if desired.

Each flip-flop 10, 12, 14 has a set terminal 22, 24, 26, and a reset terminal 28, 30, 32, respectively, which function in the conventional manner when a voltage of proper magnitude and polarity is applied thereto to set or reset the flip-flop circuit in the normal manner to change its condition as seen by output terminals 16, 18, 20, from an On to an Off state, each flip-flop being On when in a set condition.

Connected between each set terminal 22, 24, 26, and a common bus line 40, are serially connected resistors 29, 31, 33 and respective normally open switches 34, 36, 38. Line 40 is in turn connected to a suitable source of positive signal voltage shown in block schematic form and generally indicated as 42. Signal 42 may, if desired, be a generator of positive pulses of pre-determined magnitude and time duration. Also connected between each set terminal 22, 24, 26 and ground, is a capacitor 44, 46, 48.

Reset terminals 28, 30, 32 are connected to each other by a common bus line 50. A plurality of asymmetric impedances such as diodes 52, 54, 56 are each serially connected between bus line 50 and associated switches 34, 36, 38, in a manner such that only positive signals render impedances 52, 54, 56 conductive and are thus transmitted to associated reset terminals 28, 30, 32.

The present invention is primarily intended for use in systems having a plurality of flip-flop switches which may be randomly switched, but in which only one flip-flop is On at a given time. Interlock circuitry to accomplish this function has been omitted for the sake of brevity, as it plays no part in this invention.

The operation of the invention will now be described. By way of example, assume that it is desired to place flip-flop 10 in an On condition, that it is now in on Off or reset condition, and that either flip-flop circuit 12 or 14 is presently On.

Upon closing switch 34, a positive signal from supply 42 is fed to set terminal 22 to switch flip-flop 10 from a reset to a set condition. However, the pulse applied to set terminal 22 is delayed slightly in time by the action of resistor 28 and capacitor 44 which forms a conventional RC filter. Because of the time delaying action of the RC filter, the positive going pulse signal first passes through asymmetric impedance 52 to reset terminal 28, thereby resetting flip-flop 10 and the other flip-flops 12 and 14, since the same signal is also transmitted to reset terminals 30 and 32 by means of common bus 50. The delay time of resistor-capacitor combination 28, 44 is adjusted by appropriate selection of the component values thereof so that it is slightly longer than the inherent reset-set time of flip-flop 10. Thus, although the positive input pulse signal applied by the closing of switch 34 resets flip-flop 10 initially, it sets the flip-flop a short time interval later, after the pulse signal has passed through the time delay RC filter.

If another or spurious signal is generated upon the closing of switch 34, due to switch bounce or other causes, a misfire of flip-flop 10 cannot happen as the identical signal is used for both reset and set. Therefore, upon the occurrence of a spurious signal, flip-flop 10 would merely reset and then set again on the erroneous signal produced by the bounce. The same action, of course, obtains when it is desired to place in an On condition either flip-flop 12 or 14 or other flip-flops that may be connected to the string but not shown in FIG. 1. Thus, in every case, for every flip-flop, the pulse that sets a selected flip-flop is the identical pulse that also resets all of the others in the string that may be in a set condition.

Figure 2:
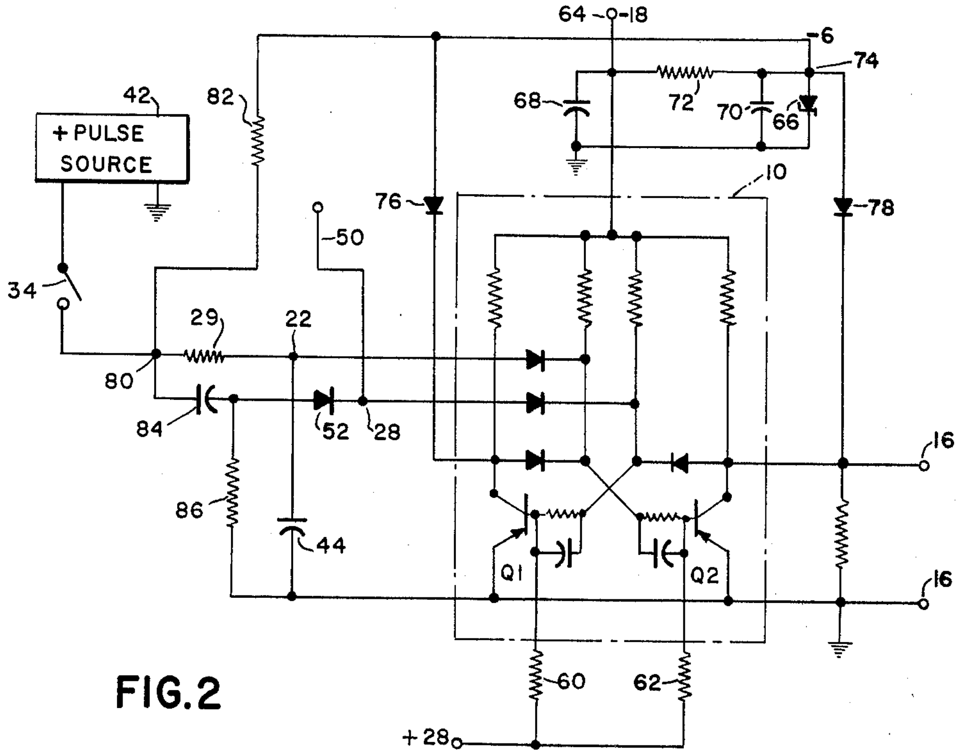
FIG. 2 is a schematic circuit diagram of a single flip-flop circuit and associated control circuit in accordance with an embodiment of the invention.

Referring now to FIG. 2, a detailed schematic diagram of the present invention controlling a single flip-flop circuit is shown. By way of example, flip-flop switcher 10 and associated circuitry is shown, and where appropriate, like reference numerals are used to identify like components. Flip-flop 10 is illustrated as a conventional transistorized, bistable multivibrator having set and reset terminals 22, 28 respectively. Positive voltage which may be 28 volts is supplied from a suitable source through resistors 60, 62 to the base electrodes of transistors $Q_1$ and $Q_2$ of flip-flop switcher 10. A suitable source of negative voltage is applied to terminal 64 to supply, for example, minus 18 volts, to the collector electrodes of transistors $K_1$ and $Q_2$ respectively. Also connected to terminal 64 is a voltage regulating circuit comprising a zener diode 66 with associated filter components consisting of capacitors 68, 70 and a resistor 72. These components are connected in a conventional RC filter circuit to provide a regulated voltage at terminal 74, for example minus 6 volts, which is applied through diodes 76, 78, when conductive, to the collector electrodes of transistors $Q_1$ and $Q_2$ respectively.

Connected to set terminal 22 are resistor 29 and capacitor 44 forming the RC time delay circuit described above. Connected to reset terminal 28 are diode 52 and reset bus line 50, the latter being in turn connected to the reset terminals of other flip-flop switching stages. Resistor 29 is connected to a terminal 80 which in turn is connected to switch 34, which, when closed, applies pulses from a pulse source 42, as described above. Also connected to terminal 80 is a resistor 82 which allows the regulated negative voltage from terminal 74 to be applied to set terminal 22, thereby aiding flip-flop 10 to remain in a reset condition by thus applying a negative bias to set terminal 22, until overcome by a positive pulse from source 42 upon the closing of switch 34. The set pulse from pulse source 42 is also applied to reset terminal 28 through a capacitor 84 of relatively large magnitude in comparison with the magnitude of capacitor 44, and diode 52. A resistor 86 is connected between ground and the junction of capacitor 84 and diode 52 to provide a discharge path for capacitor 84.

It will be seen that when a positive switching pulse signal is applied by the closure of switch 34 from pulse signal source 42, it passes through capacitor 84, positively biases diode 52, and accordingly places flip-flop 10 in a reset condition by turning transistor $Q_2$ On and transistor $Q_1$ Off. The reset-set operation of flip-flop 10 is conventional and therefore will not be described. During this interval, the voltage appearing across terminals 16 becomes substantially zero due to the low impedance of transistor $Q_2$ when conducting.

After the positive switching pulse has been delayed by RC time delay components 29 and 44, respectively, for a period of time at least longer than the normal switching time of flip-flop 10, the switching pulse then places transistor $Q_1$ in an On condition and cuts Off transistor $Q_2$. Transistor $Q_2$ then presents a high impedance across terminals 16, which effectively allows voltage from terminal 64 to bias diode 78 in a forward conducting direction so that a regulated, −6 volts appear across terminals 16. If terminals 16 are connected to an appropriate utilization circuit such as a transistor amplifier, it will be appreciated that the changing of the output voltage thereof from zero to a −6 volts may be used as a switching voltage to turn an associated transistor circuit from Off to On.

In order to simplify the description of the present invention, signal transmitting switches 34, 36, 38 are shown in FIGS. 1 and 2 as simple, normally open switches. However, they are preferably of the impulse, or momentary closing type, since only a single voltage pulse, or a positive D.C. voltage momentarily applied by one of the switches 34, 36, 38 is needed to shift the state of a corresponding flip-flop unit. If it is desired to apply a positive D.C. voltage through switches which remain closed when actuated, then, of cource, the switches 34, 36, 38 should be electrically or mechanically interlocked so that the closure of any one switch of the group causes all other switches to open.

The invention hereinabove described may therefore be varied in construction with the scope of the claims, for the particular device selected to illustrate the invention is but one of many possible embodiments of the same. The invention, therefore, is not to be restricted to the precise details of the structure shown and described.

I claim:

1. Control apparatus for a plurality of bistable electronic switches comprising, a control signal source, a plurality of bistable switching units having set and reset states, selectively operable means connected to said control signal source for applying a control signal to a selected one of said bistable units, said signal being effective to first reset and then set said selected unit, means interconnecting each of said bistable units and coupled to said signal applying means and operative in response to the application of a control signal to a selected one of said bistable units to place the remainder of said bistable units in a reset state, said signal applying means including signal delaying means connected to each bistable unit and effective to delay the setting of a corresponding bistable unit when a control signal is applied thereto for a selected period of time at least as long as the time required to place the remainder of said bistable units in a reset state.

2. Control apparatus for a plurality of bistable electronic switches comprising, a source of input switching signals, a plurality of bistable switching units, each unit having reset and set input terminals, and first and second signal channels, respectively, connected to said reset and set terminals and to said source of input switching signals, said reset terminals having a common connection therebetween, an asymmetric impedance serially connected in each of said first channels between said common connection and said source of input switching terminals and signal delaying means connected in each of said second channels, selectively operable means for applying a switching signal simultaneously to the first and second channels of a selected one of said bistable switching units to effect the successive resetting and setting of said selected bistable switching unit, said signal in said second channel being delayed by said signal delaying means to allow said bistable switching unit to first set and reset, the remainder of said bistable switching units being placed in a reset state by transmission of said applied switching signal to said commonly connected reset terminals, said applied switching signal being prevented from setting the remainder of said bistable switching units by said serially connected asymmetric impedance.

3. Control apparatus for a plurality of bistable electronic switches comprising, a plurality of flip flop units each having set and reset input terminals, a source of input switching signals, a first channel connected to said signal source and commonly connected to each of said reset terminals, each of said flip flop units having an individual second channel connected to its set terminal and to said signal source and including individual signal delaying means associated therewith, and means for applying a switching signal simultaneously to said first channel and a selected one of said second channels to effect the resetting of all of said flip flop units and the successive setting of the flip flop unit connected to said selected one of said second channels, said signal in said selected second channel being delayed by said associated signal delaying means to allow said flip flop to first reset and then set.

4. The invention defined in claim 3 including an individual asymmetric impedance serially connected between said first channel and each of said flip flop units and effective to allow only signals of a selected polarity to reset said associated flip flop unit.

5. The invention defined in claim 3 wherein the delay time of each individual signal delay means is at least as great as the inherent switching time of its associated flip flop unit.

References Cited by the Examiner

UNITED STATES PATENTS

| | | | |
|---|---|---|---|
| 2,723,346 | 11/1955 | Magnuson | 307—88.5 |
| 2,943,248 | 6/1960 | Ritchey | 307—88.5 |
| 3,008,055 | 11/1961 | Crosby et al. | 307—88.5 |
| 3,010,031 | 11/1961 | Baker | 307—88.5 |
| 3,067,341 | 12/1962 | Kunze | 307—88.5 |

ARTHUR GAUSS, *Primary Examiner.*

J. BUSCH, *Assistant Examiner.*